Feb. 9, 1971           R. A. DU BOSE           3,561,127
METHOD AND APPARATUS FOR DETERMINING REMOTE POINTS
FROM REFERENCE POINT BY LIQUID LEVEL
Filed May 17, 1968
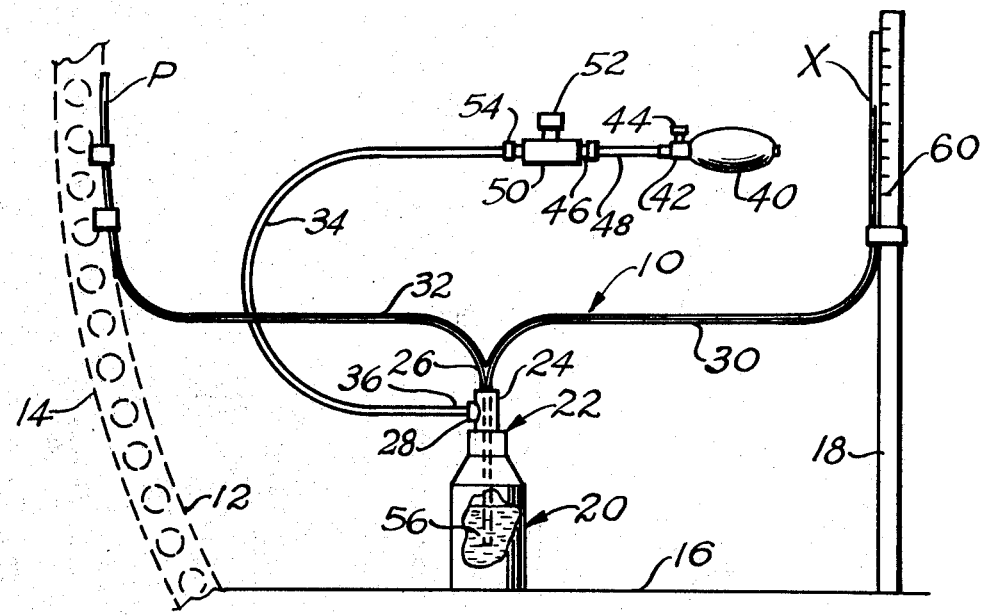
FIG. 1
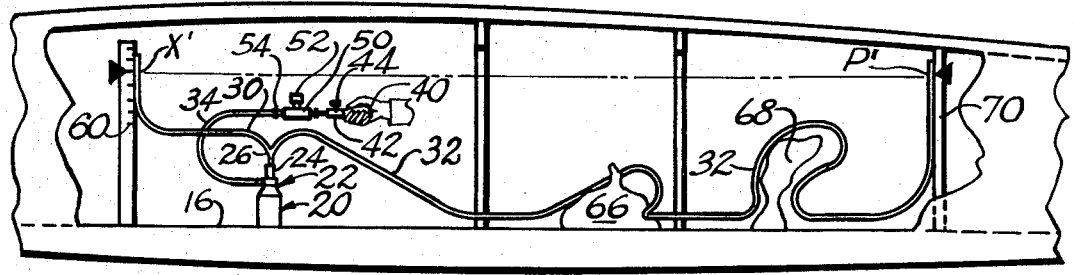
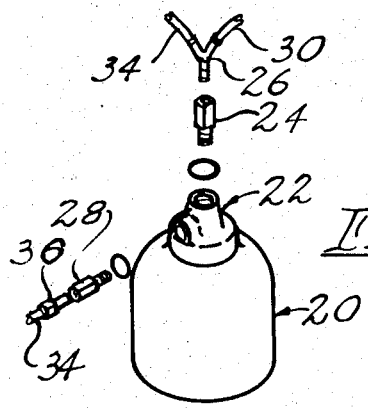
FIG. 2
FIG. 3
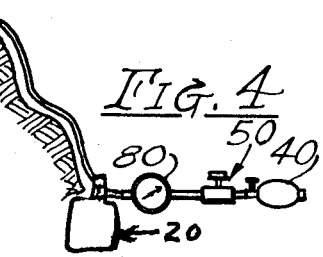
FIG. 4
INVENTOR
RONALD A. DuBOSE
BY
ATTORNEY

United States Patent Office 3,561,127
Patented Feb. 9, 1971

3,561,127
METHOD AND APPARATUS FOR DETERMINING REMOTE POINTS FROM REFERENCE POINT BY LIQUID LEVEL
Ronald A. Du Bose, Atlanta, Ga.
(866 Parkway Drive, Smyrna, Ga. 30080)
Filed May 17, 1968, Ser. No. 730,008
Int. Cl. G01c 5/04
U.S. Cl. 33—209
12 Claims

ABSTRACT OF THE DISCLOSURE

To locate one or more points accurately from a base reference point such as locating positions on an aircraft structure during construction or repair where optical location is impractical, liquid in a tank that can be pressurized is piped and indexed at the base location and then one or more conduits such as flexible, clear plastic tubing are run to the remote points and then the container is pressurized to bring the liquid to the reference point which also brings the liquid to the remote point to be located whereat it may be stopped by holding the pressure at that point. A typical apparatus for practicing the present method would include a pressure vessel such as a paint spray tank having a quick-connect-fitting on the top and contains a supply of liquid such as 80% dyed water and 20% alcohol. A Y fitting on the quick-connect-fitting leads by a plastic tube to the reference point from one branch of the Y into the remote point from the other branch of the Y. A hand operated rubber bulb squeeze pump with bleed valves and fine control needle valve is connected to the tank and is pumped by hand to pressurize the tank to drive the liquids into the respective lines and when the level of the liquid in the lines is approximately of the desired level, the fine control valve is operated to bring the reference point to exact level and the remote point will then be properly located and may be marked after which the equipment is removed.

BACKGROUND OF THE INVENTION

(1) Field of the invention

Liquid leveling devices and particularly such devices in conjunction with pressurized liquid supply.

(2) Description of the prior art

The basic principle of leveling a liquid in a tube is well known. Such unassisted gravity feed arrangements are not suitable per se for use in remote areas as the liquid height cannot be maintained in the proper relationship. There is little or no control over such a basic arrangement. Optical leveling systems of course are well known but require some amount of linear sight vision and are fairly expensive. In addition, optical system leveling is time consuming and requires some amount of data tabulation and the reading of stills on equipment which is subject to human error. For example, in the assembly of large aircraft in a cluttered assembly plant it is very difficult to set up optical leveling equipment for the purpose of locating each and every station or location on various positions throughout the many different levels of a large aircraft for the purpose of locating an item of equipment or placing a bracket or for some other reason. The present device solves some of the problem of locating positions at different places in the aircraft and does not require a permanent indexing or reference point system to be set up throughout the aircraft and maintained from start to finish since the present system is very quick to install, very fast and accurate to use and very easy to remove and to reinstall if necessary. The problem of congested and cluttered area and clear line of vision at times is surmounted by the present invention.

SUMMARY OF THE INVENTION

According to the present method, liquid in a reference tube is brought to the level of the reference point which is the point on a reference post or indicator at which remote from that point another point is to be established. A flexible reference point tube in communication with the reference liquid tube is led without regard to the path or pattern, as long as the tube remains open, until it reaches the approximate location of the point to be accurately located whereat it is taped or otherwise temporarily fastened. The reference tube and the remote tube are pressurized with a supply of liquid until the reference point has reached the proper level at which time the remote point will be at the corresponding and same level whereupon the pressure may be controlled and sealed until a mark is made at the remote point. The operator need only to observe the liquid level in the reference tube and to stop the liquid at that point which establishes the corresponding point in the remote tube. Apparatus for establishing the remote point comprises a pressure vessel such as a paint spray tank with a liquid such as colored alcohol and water therein. The pressure vessel has the female part of the quick connecting coupling thereon and the male part is provided with a wire fitting one branch of which is connected to a clear plastic reference tube and the other branch of which is connected to a clear plastic remote tube and a quick connect fitting on the male wire fitting includes a quick connecting detached airline fitting which receives an airline to which is attached a hand squeeze bulb with a bleed valve and fine control valve thereon.

BRIEF DESCRIPTION OF THE DRAWING

Other and further objects and advantages of this invention will be apparent upon reading the following specification taken in conjunction with the accompanying drawings, in which:

FIG. 1 is a diagrammatic view of the present invention applied to an aircraft structure.

FIG. 2 is a diagrammatic view of the present invention applied in a different manner to an aircraft structure.

FIG. 3 is an elevation view of the pressure vessel and the fittings of the present invention.

FIG. 4 is a diagrammatic view of a modified form of the invention.

DESCRIPTION OF THE PREFERRED METHOD AND EMBODIMENT

The device of the present invention is designated overall and generally in completed assembly by reference numeral 10 and is shown in full lines in FIG. 1 wherein portions of a typical aircraft structure under assembly is designated by reference numeral 12 and comprises structural fuselage members 14 and transverse members 16 having intermediate members 18 thereon. The problem solved by the present invention in the procedure followed is to locate a point on member 14 by using the reference post 18 which has graduations thereon corresponding to the different elevations from a zero point of the aircraft.

A pressure vessel 20 such as a conventional paint spray tank has a quick connect and disconnect device designated by reference numeral 22 and which includes a female portion on the neck of the pressure vessel 20 in which is inserted and detached a male fitting 24 having a Y connector 26 thereon and also having a detachable airline connection 28 thereon. A suitable vessel 20 is made by Campbell-Hansfeld Co. as shown in FIG. 3. A suitable device 22 is sold under the mark "Kwik-Connect" from Imperial-Eastman Corp., Chicago Ill.

Y connector 26 has attached thereto a reference tube 30 which may be a clear plastic tube of the sort commonly found in medical and industrial use and a remote tube 32 also possibly of clear plastic the same as tube 30.

A pressurizing means comprising a pressure line 34 connected by a fitting 36 to the air connection 28 on tank 20 has a manually operated squeeze bulb 40 connected thereto which has a bleed valve 42 thereon with a manually control knob 44. Bulb 40 and the valve 42 are the same as that found on blood pressure devices and are sold by trademark "Taylor" from Asheville, N.C. A conventional brass fitting 46 connects the tube 48 from the bulb valve 42 to a fine control valve 50 having a manual control knob 52 thereon. Valve 50 may be that sold under the trademark "Colorflow" by Manatrol, Elyria, Ohio, and disclosed in Pat. No. 3,485,592. Valve 50 is a very fine control valve and contains the color index as well as number system to permit very close limits of operation and it is connected by common fitting 54 to the airline 34. Hand pumping of bulb 40 with the bleed valve 44 closed and the air control valve 50 open will pressurize the pressure vessel 20 in which there is a fluid designated generally by reference numeral 56 and which may be a combination of approximately 80% colored water and 20% colored alcohol which may be colored by means of an ordinary pure food dye of red, orange or other bright color so that it may be readily observed in the clear plastic tubes 30, 32. Valve 44 permits air flow in one direction only which is away from the bulb 40 and toward the pressure vessel 20 when the valve 44 is closed. Valve 44 permits flow in the other direction only when valve 44 is open. Valve 57 on bulb 40 is a one directional check valve to allow air to refill the bulb 40 after it has been squeezed.

A typical use, operation and installation is shown diagrammatically in FIG. 1 wherein a reference post such as a calibrated standard 18 having markings 60 thereon which is leveled vertically and marked to correspond with the reference indicator on the aircraft, has the reference tube 30 connected thereto and the tube is taped by ordinary duct or green tape in position vertical on the standard 18 so that any reference point may be read by sight. The remote tube 32 is led to the vicinity and area where the remote point is to be located and it is taped to a convenient member such as the airframe member 14. The clear plastic tubes 30, 32 by means of the fitting 24 have been tightly coupled to the pressure vessel 20 and the female portion 22 thereof and the airline 34 is tightly in place. A point P may be located in the reference tube 32 and marked on the member 14 in the following manner:

(1) Close the bleed valve 44 on the squeeze bulb pump 40.

(2) Open the needle valve 50 by operating manual control 52 sufficient to open the line to receive air pumped therein.

(3) Pump briskly by hand to just above desired level. It is suggested that the pumping be brisk in order to prevent the forming of air bubbles in the lines 30, 32 but if they do form the lines may be lifted to a vertical position and the bubbles allowed to rise from the surface and clear the lines. If desired, the lines may be pumped out and bled into a container.

(4) Close the fine control valve 50.

(5) Open the bleed valve 44 and allow the air to escape in controlled amounts by operating valve 50 while observing the reference point of the fluid in the line 30 as it travels close to the desired indication on standard 60. Note: all downward movements should be controlled by valve 50 with valve 44 open.

(6) Adjust the height by stopping the reference liquid in line 30 just above the point desired and then adjust the height very accurately by accurately controlling the control 52 on the valve 50.

(7) When the exact level is reached at the position desired on standard 60 in the tube 30, close the fine control valve 50 and read the level P in the remote tube 32 which will be a level corresponding to the point X in the reference standard 60. A mark may be scribed in a location next to the point P and the entire apparatus may be removed.

It is desirable that one always check to see that the level in both tubes is the same by placing them side-by-side after each series of measurements. If the levels are not the same, then inspect the lines for trash, air bubbles, kinks or temperature differential and make suitable repair or adjustment until the levels are the same. After the desired point has been located and the equipment is no longer needed, the valve 50 and the valve 44 are opened and the liquid is allowed to drain back into the tank which may be assisted by raising the tubes as high as possible. The quick disconnect fittings 24 and 36 are removed and the device restored. Fittings 24 and 36 automatically shut-off when disconnected and thus prevent loss of fluid where applicable.

In FIG. 2 there is indicated how the present device may be used in a cluttered and obstructed area where it is not possible to view the reference point and the point to be located at the same time. The procedure is exactly the same as that described in connection with FIG. 1. It should be noted that a longer remote tube 32 is used and even though there are various obstructions such as equipment 66 and 68, the remote tube 32 may be led around such equipment in a circuitous path until it is taped to the frame member 70 at which the remote point P' is to be read. The setting up of the equipment is the same as that in connection with FIG. 1. The reference tube 30 is taped to the reference standard 60 and the point to be located X' is established. The bulb 40 is pumped and the liquid is caused to travel the circuitous path through tubing 32 until it reaches the desired level at point P'. Obviously, many other tubes 32 may be used simultaneously there being no limit as to number except that which is convenient in the particular operation taking place.

In the modified form shown in FIG. 4, the reference tube 32 is eliminated and in lieu thereof a pressure gauge, such as a Bourdon gauge is substituted therefor which is calibrated to read according to a pre-prepared chart that will indicate according to a certain reading on the gauge a certain position with respect to the reference has been obtained. The chart (not shown) has to be worked out by computation which can be done by using the arrangement shown in FIGS. 1 or 2 or similar arrangement until a sufficient basis has been established to calculate how many inches of water or inches of mercury as represented on the gauge dial indicator 80 corresponds to what locator point on the index standard 60. The chart can contain as many fractions of units of calibration of the dial indicator as desired and will locate accordingly. This may be used when it is impractical or less desirous to establish a reference point tube 30 such as in land topographical work where it is desired to get certain basic readings at different locations on the land without going to the trouble and expense of setting up a formal optical survey. By establishing various points based upon a chart and the dial indicator, using a topographical map it is possible to get at least a rough survey of the land with a minimum of time and expense.

While I have shown and described a particular embodiment of my invention together with a suggested mode of operation, and there is also shown and described an alternative form, this is by way of illustration only and does not constitute any sort of limitation since various alterations, changes, deviations, amendments, additions, substitutions, revisions and departures may be made in the embodiments of both the method and apparatus shown without departing from the scope of my invention.

What is claimed:

1. In a method for locating a remote point in the same horizontal plane as a reference point, the steps comprising: confining a liquid in a pressure vessel in communication with a remote tube which has an open end higher than the point to be located, applying an internal gas pressure within said pressure vessel and through an opening in said vessel, leading to and against said liquid therein and then pressurizing said tube in communication was a reference indicator means which establishes the reference index, stopping said liquid level in said remote tube when said index indicates the proper location, and adjusting said gas pressure as required when establishing a series of points in the horizontal plane as said index by maintaining said liquid level in said remote tube at a point corresponding to the index.

2. The method claimed in claim 1, wherein: said remote tube is in pressure communication with a reference tube which is located at the index point, said pressurization of said remote tube and said reference tube being operated to bring the liquid level in the reference tube to proper location which simultaneously brings the liquid level and said reference tube to the proper point to be located.

3. The method claimed in claim 2, wherein: said remote tube and said reference tube are both connected to a pressure vessel which has a supply of liquid therein, and said pressure vessel is subjected to controlled pressure to stop the liquids at the proper level.

4. The method claimed in claim 3, wherein: said tubes are clear plastic and said liquid is visible therein.

5. The method claimed in claim 1: means for controlling said pressure applied through said opening to vary same by increasing, decreasing or sustaining same in said pressure vessel.

6. The method claimed in claim 1: pressurizing said pressure vessel by means of gas pressure from a controlled source.

7. In an apparatus for locating a remote point from an established reference point:
  (a) a pressure vessel having a supply of liquid therein,
  (b) a means for applying gas pressure from a remote location through an opening in said pressure vessel against the liquid in said pressure vessel,
  (c) a reference conduit in communication with said pressure vessel,
  (d) a reference index means in association with said reference conduit to establish by the response of said liquid to said gas pressure a reference point in said reference conduit,
  (e) a remote conduit in communication with said pressure vessel and said reference conduit, the liquid level in said reference and remote conduits are brought to said reference point simultaneously by said gas pressure means,
  (f) control means for said gas pressure means including means for fine adjustment of said liquid level by relieving said gas pressure and for sustaining said gas pressure at a particular magnitude corresponding to said reference point.

8. The device claimed in claim 7, wherein:
said conduit is a plastic tube having said liquid visible therein.

9. The device claimed in claim 8, wherein:
said pressure means is a pressure line in communication with said pressure vessel and having a manually operated air pressure device thereon.

10. The device claimed in claim 9, wherein:
said pressure device is a squeeze bulb having a bleed valve thereon, there also being a pressure control valve manually operated for fine control of said pressure to sustain same at a particular point.

11. The device in claim 7: said reference conduit in liquid and pressure communication with said pressure vessel and said remote conduit, said liquid level in said reference conduit establishing the reference point.

12. The device in claim 7: said reference index means being a pressure gauge having calibrations thereon corresponding to the reference points to be selected.

References Cited

UNITED STATES PATENTS

| | | | |
|---|---|---|---|
| 318,885 | 5/1885 | Espenschield | 33—209 |
| 2,532,883 | 12/1950 | Bennett | 33—209 |
| 2,672,758 | 3/1954 | Hibbard | 33—209 |
| 3,117,381 | 1/1964 | Durkin | 33—209 |
| 2,709,920 | 6/1955 | Moore | 73—432HA |

FOREIGN PATENTS

| | | | |
|---|---|---|---|
| 934 | 1911 | England | 33—209 |
| 301,098 | 1936 | Italy | 33—209 |
| 67,019 | 1960 | Australia | 73—432(HA) |

LEONARD FORMAN, Primary Examiner

D. A. DEARING, Assistant Examiner